United States Patent
Heitzer et al.

(10) Patent No.: US 9,138,929 B2
(45) Date of Patent: Sep. 22, 2015

(54) SIMULATION OF EJECTION AFTER MOLD FILLING

(75) Inventors: Michael Heitzer, Aachen (DE); Jörg Klinkhammer, Wuerselen (DE); Jesper Thorborg, Kongens Lyngby (DK)

(73) Assignee: MAGMA Giessereitechnologie GmbH, Aachen (DE)

( * ) Notice: Subject to any disclaimer, the term of this patent is extended or adjusted under 35 U.S.C. 154(b) by 722 days.

(21) Appl. No.: 13/265,120

(22) PCT Filed: Apr. 22, 2010

(86) PCT No.: PCT/EP2010/002478
§ 371 (c)(1),
(2), (4) Date: Oct. 18, 2011

(87) PCT Pub. No.: WO2010/127772
PCT Pub. Date: Nov. 11, 2010

(65) Prior Publication Data
US 2012/0035891 A1 Feb. 9, 2012

Related U.S. Application Data

(60) Provisional application No. 61/176,238, filed on May 7, 2009.

(51) Int. Cl.
*G06F 17/50* (2006.01)
*G06F 17/11* (2006.01)
(Continued)

(52) U.S. Cl.
CPC .............. *B29C 45/7693* (2013.01); *B29C 45/40* (2013.01); *G06F 17/5009* (2013.01); *G06F 17/5018* (2013.01); *G06F 2217/16* (2013.01); *G06F 2217/41* (2013.01)

(58) Field of Classification Search
CPC .......... B29C 33/3835; B29C 45/768–45/7693; G05B 2219/35044; G06F 17/5018; G06F 17/5086; G06F 2217/12; G06F 2217/41
USPC .............................................. 703/6
See application file for complete search history.

(56) References Cited

U.S. PATENT DOCUMENTS 5,812,402 A * 9/1998 Nishiyama et al. ............. 700/97
6,136,235 A * 10/2000 Saito et al. ................... 264/40.1
(Continued)

FOREIGN PATENT DOCUMENTS

EP 1724716 11/2006
JP 07009522 1/1995
(Continued)

OTHER PUBLICATIONS

Mok et al, "An Internet-based Intelligent Design System for Injection Moulds", Robotics and Computer-Integrated Manufacturing, 24, pp. 1-15, 2008.*
(Continued)

*Primary Examiner* — Mary C Jacob
(74) *Attorney, Agent, or Firm* — K. David Crockett, Esq.; Crockett & Crockett, PC

(57) ABSTRACT

A method, apparatus and software product for simulating the ejection of a part after mold filling and cooling in combination with phase transformation/solidification. A three dimensional computer model defining the geometry of the solution domain is provided and the boundary conditions are specified. The solution domain is enmeshed and the physical data for the materials are attached. The static equilibrium equations are solved and the effects of the ejection process on the part are computed.

9 Claims, 15 Drawing Sheets

(51) Int. Cl.
   *B29C 45/76*   (2006.01)
   *B29C 45/40*   (2006.01)

(56) References Cited

U.S. PATENT DOCUMENTS

| | | | |
|---|---|---|---|
| 6,572,796 B1 | | 6/2003 | Gao et al. |
| 7,024,342 B1 * | | 4/2006 | Waite et al. ............... 703/6 |
| 7,496,528 B2 * | | 2/2009 | Lukis et al. ............. 705/26.4 |

FOREIGN PATENT DOCUMENTS

| | | |
|---|---|---|
| JP | 07085128 | 3/1995 |
| JP | 2001205682 | 7/2001 |
| WO | WO0123163 | 4/2001 |
| WO | WO2009003677 | 1/2009 |

OTHER PUBLICATIONS

Pontes et al, "Ejection Force of Tubular Injection Moldings. Part II: A Prediction Model", Polymer Engineering and Science, Mar. 2005.*

Written Opinion of the International Searching Authority, PCT/EP2010/002478, dated Jul. 11, 2011.*

Jangha et al, EDMS: A System to Determine Ejection Layout for Rapid-Tooled Injection Molds, Proceedings of ASME DETC03, Sep. 2-6, 2003.*

Kwak et al, "Layout and Sizing of Ejector Pins for Injection Mould Design Using the Wavelet Transform", Proceedings of the Institution of Mechanical Engineers, Part B: Journal of Engineering Manufacture, vol. 217, No. 4, Apr. 2003.*

Rosato et al, "Design Features that Influence Product Performance", Injection Molding Handbook, pp. 716-769, 2000.*

Bataineh, et al., Prediction of Local Part-Mold and Ejection Force in Infection Molding, 127 J. of Manufacturing Science and Engineering 598 (2005).

Bhagavatula, et al., Modelling and Verification of Ejection Forces in Thermoplastic Injection Moulding, 12 Modeling and Simulation in Materials Science and Engineering S239 (2004).

Wang, et al., Numerical and Experimental Studies on the Ejection of Injection-Molded Plastic Products, 40 Polymer Engineering and Science 826 (2000).

Jong, et al., A Collaborative Navigation System for Concurrent Mold Design, 40 The International Journal of Advanced Manufacturing Technology 215 (2008).

* cited by examiner

Fig. 7

SIMULATION OF EJECTION AFTER MOLD FILLING

FIELD

The present application relates to processes that involve the filling of a cavity, cooling in combination with phase transformation/solidification, and the subsequent removal of a part from the cavity. In particular the application relates to simulation of such processes.

BACKGROUND

A true 3-D simulation of an injection molding process or of a metal casting process involves a complex system of many equations. Progress has been made in the past to improve the efficiency of the simulation methods to cope with these complex calculations. With optimized software and the processing power of modern workstations or PCs such simulations can be performed in a workplace, i.e. the results are obtained fast enough to be suitable outside the purely scientific research area and can be applied by engineers in research and development departments, foundries and manufacturers of injection molded articles.

Advanced versions of software for simulation of these processes are able to calculate residual stress, warpage and deformations of the part, also after ejection of the part. However, in various types of processes the forces that are applied to the part during ejection are substantial and lead to additional deformation and stress on the part. Known process simulation software has not been able to take the effects of such forces on the part into account. Design and development engineers have therefore not been able to make accurate predictions of the characteristics of the product developed without actual test runs on the work floor.

SUMMARY

On this background, the applicants realized that it would be advantageous to provide a tool that allows the effects of the ejection of the part from the cavity to be included in the computation of the resulting stresses, warpage and deformations of the part.

This object is achieved by providing a method for simulating the ejection of a part from a cavity and to compute the resulting stresses and deformation of the part on the basis of the ejection simulation.

This object is also achieved by providing an apparatus for simulating the ejection of a part from a cavity and to compute the resulting stresses and deformation of the part on the basis of the ejection simulation.

This object is also achieved by providing a computer readable medium with software code for simulating the ejection of a part from a cavity and to compute the resulting stresses and deformation of the part on the basis of the ejection simulation.

This object is also achieved by providing a user interface for an application simulating the ejection of a part from a cavity and to compute the resulting stresses and deformation of the part on the basis of the ejection simulation.

Further advantages, features and properties of the method, the apparatus, the computer readable medium and the user interface will become apparent from the detailed description.

BRIEF DESCRIPTION OF THE DRAWINGS

In the following detailed portion of the present description, the teachings of the present document will be explained in more detail with reference to the exemplary embodiments shown in the drawings, in which:

FIG. 7 is a screen shot of the simulation software of FIG. 6, showing selection of the materials and the ejector pins.

DETAILED DESCRIPTION

In the following detailed description the user interface, the method and the software product according to the teachings of this application are described in detail with reference to the exemplary embodiments.

Figure 1A:
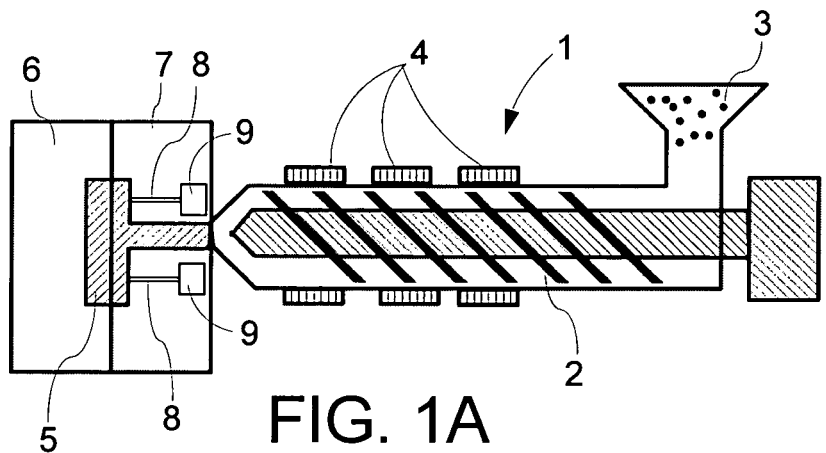
FIG. 1A is a cross-sectional view through a diagrammatic representation of an injection molding machine including a mold in a first state.

FIG. 1A shows diagrammatically an injection molding machine 1. The injection molding machine is provided with a screw 2 that is fed with polymer pellets disposed in a hopper 3. The polymer pellets are by the action of the screw 2 and heating elements 4 transformed to a viscous mass that is urged under high pressure into a mold cavity in the mold between the mold halves 6 and 7. The mold cavity is in the figure filled with the part 5 to be produced. Injector pins 8 are move by the action of actuators 9.

Figure 1B:
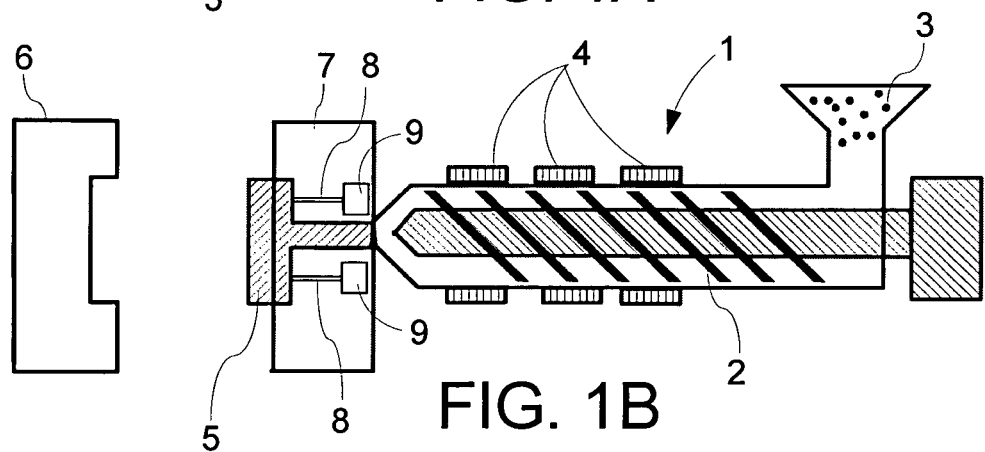
FIG. 1B is a cross-sectional view through a diagrammatic representation of the injection molding machine of FIG. 1A in a second state.
Figure 1C:
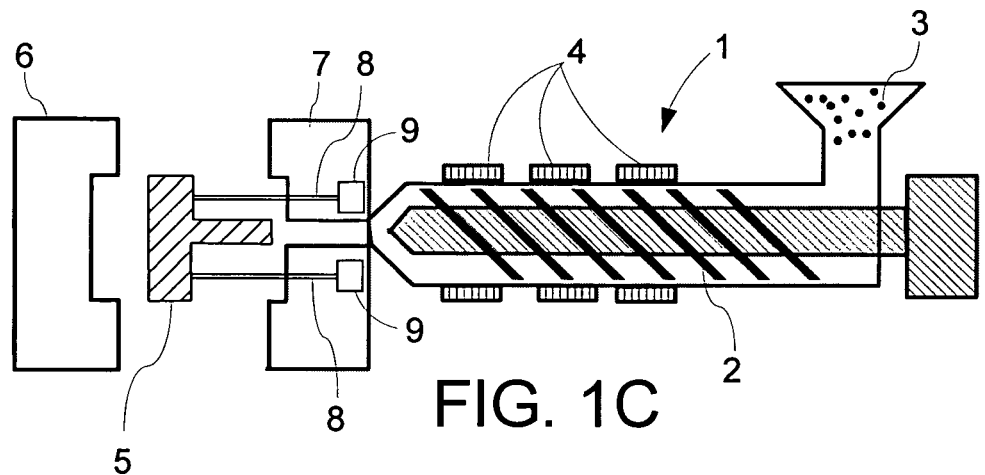
FIG. 1C is a cross-sectional view through a diagrammatic representation of the injection molding machine of FIG. 1A in a third state.

After the part has sufficiently cooled down the mold is opened (FIG. 1B) by retracting the mold half 6.

Next, the ejector pins 8 push the part 5 out of the mold cavity under the action of the actuators 9.

The molding machine and the injection molding manufacturing cycle are well-known in the art and not explained in further detail here.

Figure 2A:
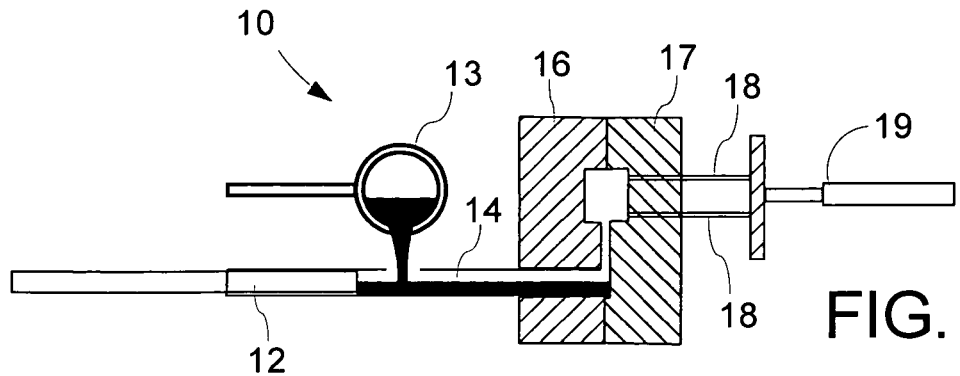
FIG. 2A is a cross-sectional view through a diagrammatic representation of a die casting machine in a first state.

FIG. 2A shows diagrammatically a die-casting machine 10. The die casting machine 10 has a die (mold) formed by two mold halves (a fixed mold halve 16 and a moving mold halve 17), a chamber 14 connected to a plunger 12 and ejector pins 18 that move by the action of an actuator 19.

The chamber 14 of die casting machine 10 is filled with liquid metal using a ladle 13.

Figure 2B:
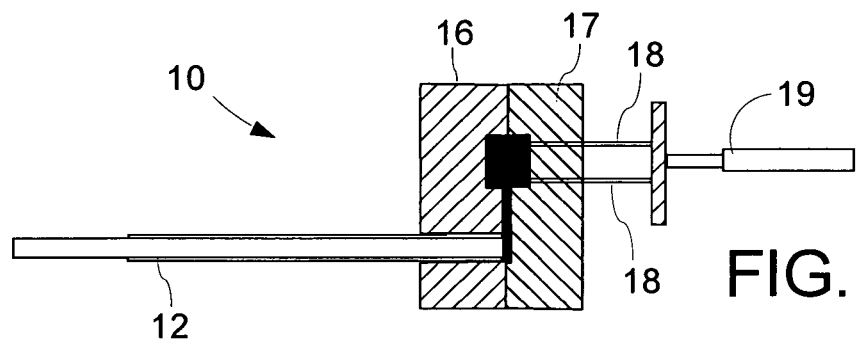
FIG. 2B is a cross-sectional view through a diagrammatic representation of the die casting machine of FIG. 2A in a second state.

In the next step the plunger 12 forces the liquid metal from the chamber 14 into the mold cavity (FIG. 2B).

Figure 2C:
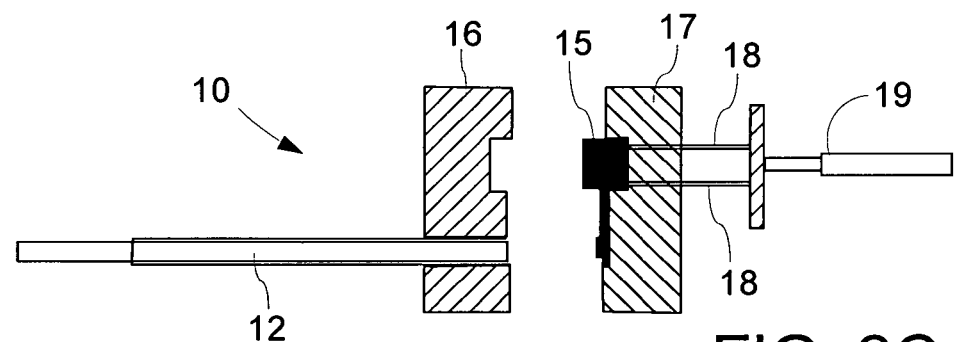
FIG. 2C is a cross-sectional view through a diagrammatic representation of the die casting machine of FIG. 2A in a third state.

When the part 15 to be produced has sufficiently cooled down and is solidified the die opens by retracting the moving mold halve 17 (FIG. 2C)

Figure 2D:
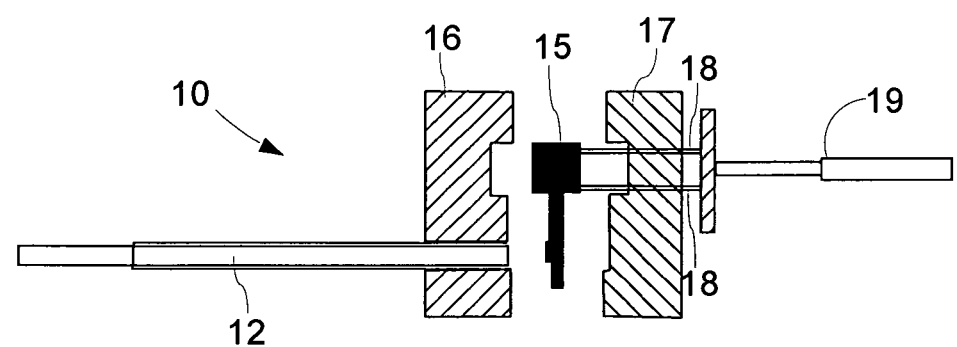
FIG. 2D is a cross-sectional view through a diagrammatic representation of the die casting machine of FIG. 2A in a fourth state.

Thereafter, the ejector pins 18 push the part 15 under the action of the actuator 19 out of the moving mold part 17 (FIG. 2D).

The die casting machine and the die casting manufacturing cycle are well-known in the art and not explained in further detail here.

However, due to the fact that the parts 5,15 are still relatively hot, the forces applied by the ejector pins 8,18 to the parts 5,15 can lead to distortion such as imprint, indentation of the part by the pin, and local material stresses of the part 5,15.

Figure 3:
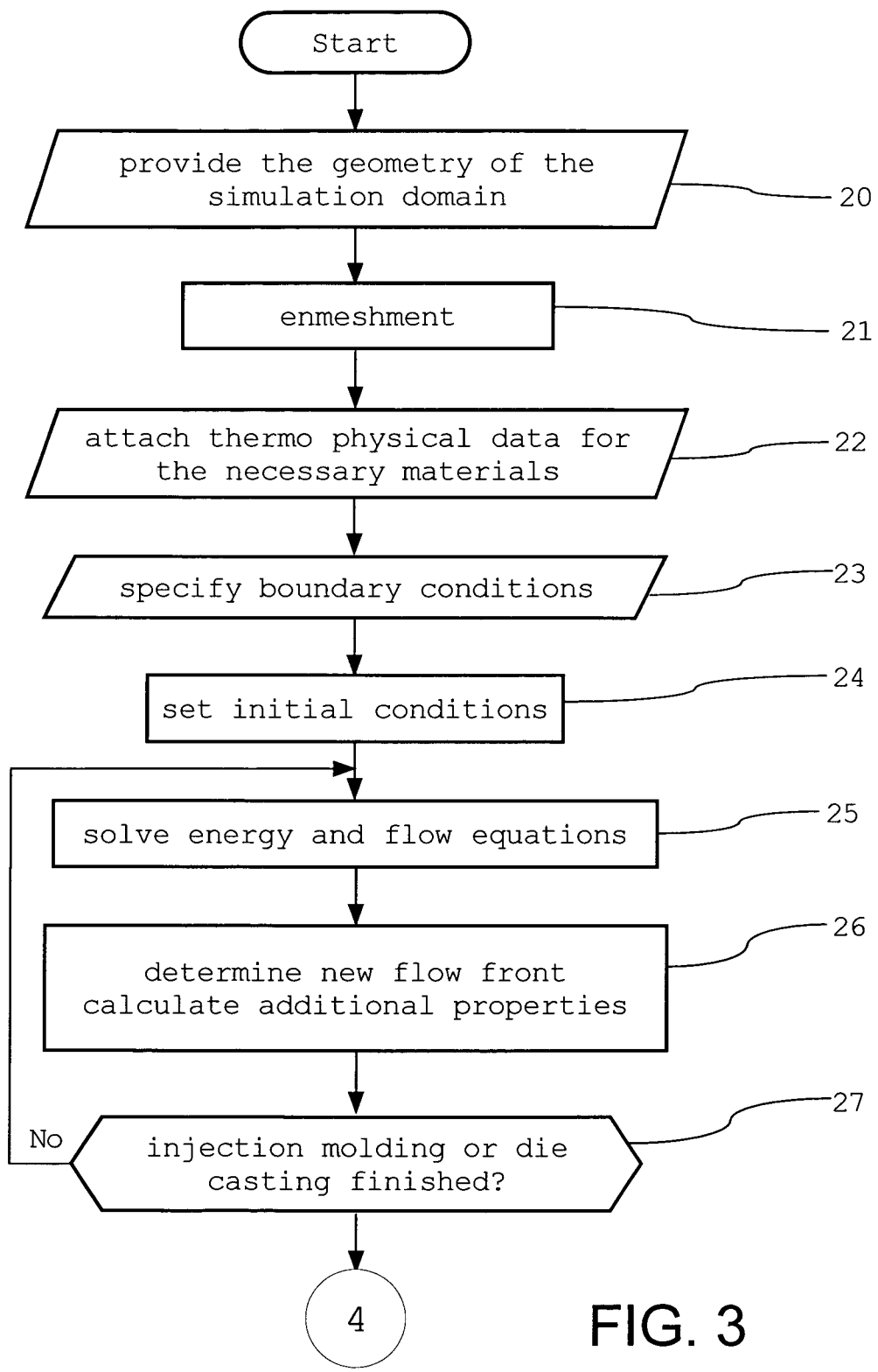
FIG. 3 is a first part of a flow chart summarizing basic process steps of simulating a mold filling and part cooling process according to an exemplary embodiment.
Figure 4:
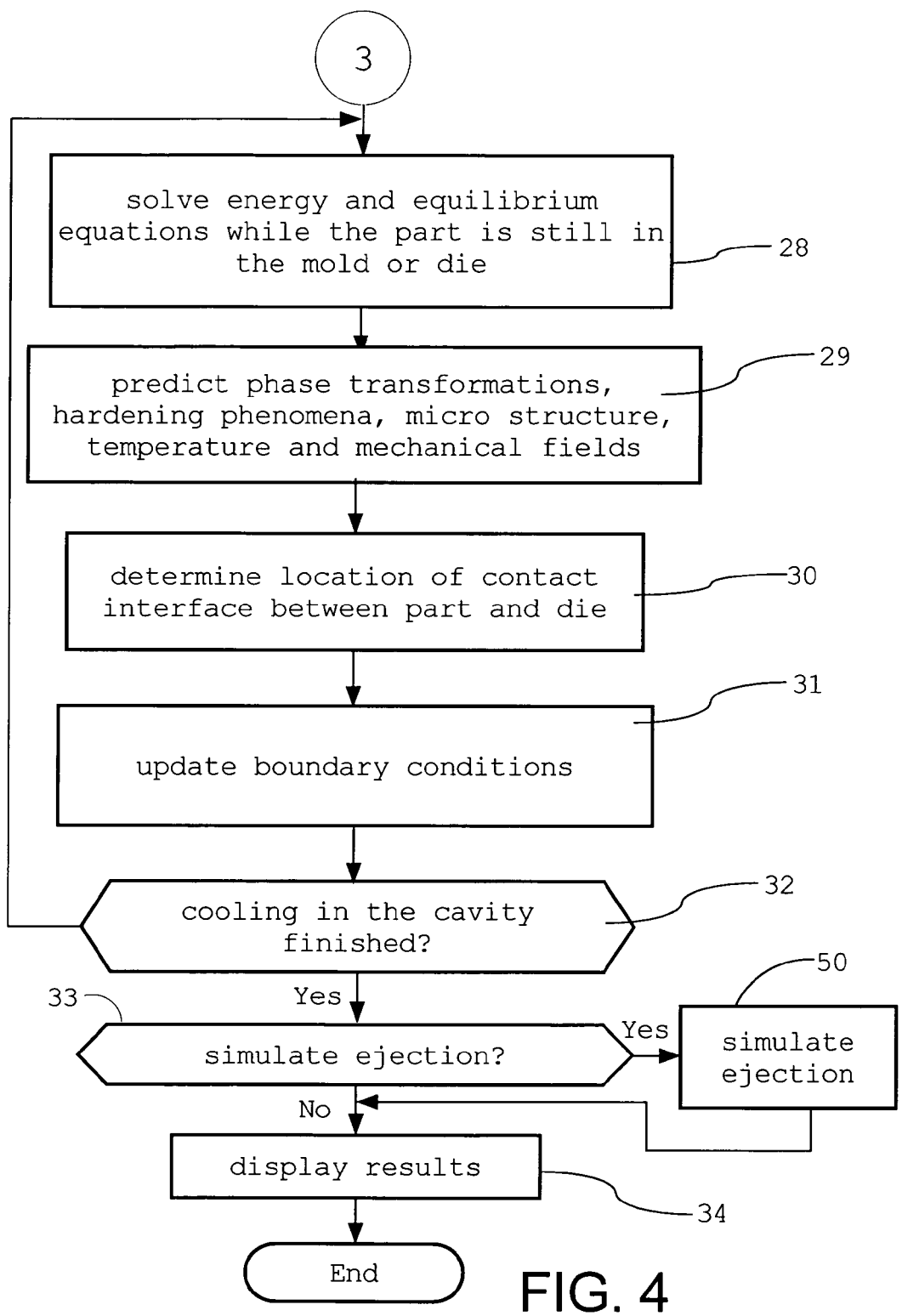
FIG. 4 is the second part of the process of FIG. 3.

Numerical simulation of the injection molding process or the die casting process on a computer can be carried out in accordance with an exemplary embodiment with the process illustrated in FIGS. 3 and 4.

The main steps of a simulation identified generally are the following:
step 20, providing a digital representation of the geometry of the simulation domain;
step 21, enmeshment, which is subdivision of the calculation domain into many small elements, which are the basis for discretizing the differential equations (utilizing different solution algorithms) and in this way finding the solutions to the physical phenomena to be simulated;
step 22, attaching the necessary physical data for the different material domains into the simulation model (data base or data bank);
step 23, specifying the boundary conditions for the simulation project,
step 24 the initial conditions for the thermo-physical material properties, the flow front, temperatures, etc. are set;
step 25 the thermal equations for the whole domain and flow equations on all fluid cells are solved using the conservation of mass, energy and momentum equations;
step 26, in this step the flow front is moved and the boundary conditions are adopted according to new flow front and additional quantities like chemical reactions are calculated, and it is verified if cells solidify;
in step 27 it is verified if the mold filling process is finished; if not the simulation continues with the next time step and the process returns to step 25;
in step 28 is the start of the cooling phase with the part still in the cavity. During the cooling or packing phase the transformation/solidification takes place and the viscous mass becomes a solid part, building up its typical mechanical properties during the cooling and transformation, influenced by shrinkage effects, deforming forces, leading to local stresses and warpage,
in step 28 the energy and equilibrium equations are solved while the part is still in the mold or die,
in step 29 the phase transformations, hardening phenomena, micro structure, temperature and mechanical fields are predicted,
in step 30 the location of contact interface between part and die is determined,
in step 31 the boundary conditions are updated,
in step 32 it is determined whether the cooling process in the cavity has finished, if the cooling process in the cavity has not finished the process returns to step 28, if the cooling process in the cavity has indeed finished the process moved to
step 33 where it is decided if the ejection process is to be simulated, if this is the case the process moves to step 50 for simulating the ejection process, the details of the ejection simulation are described in greater detail with reference to FIG. 5; and
when the ejection is not to be simulated the process moves to step 34 to store and upon user selection to display the simulation results as a graphical or numerical presentation on the display of a computer such as a PC or a workstation.

Figure 5:
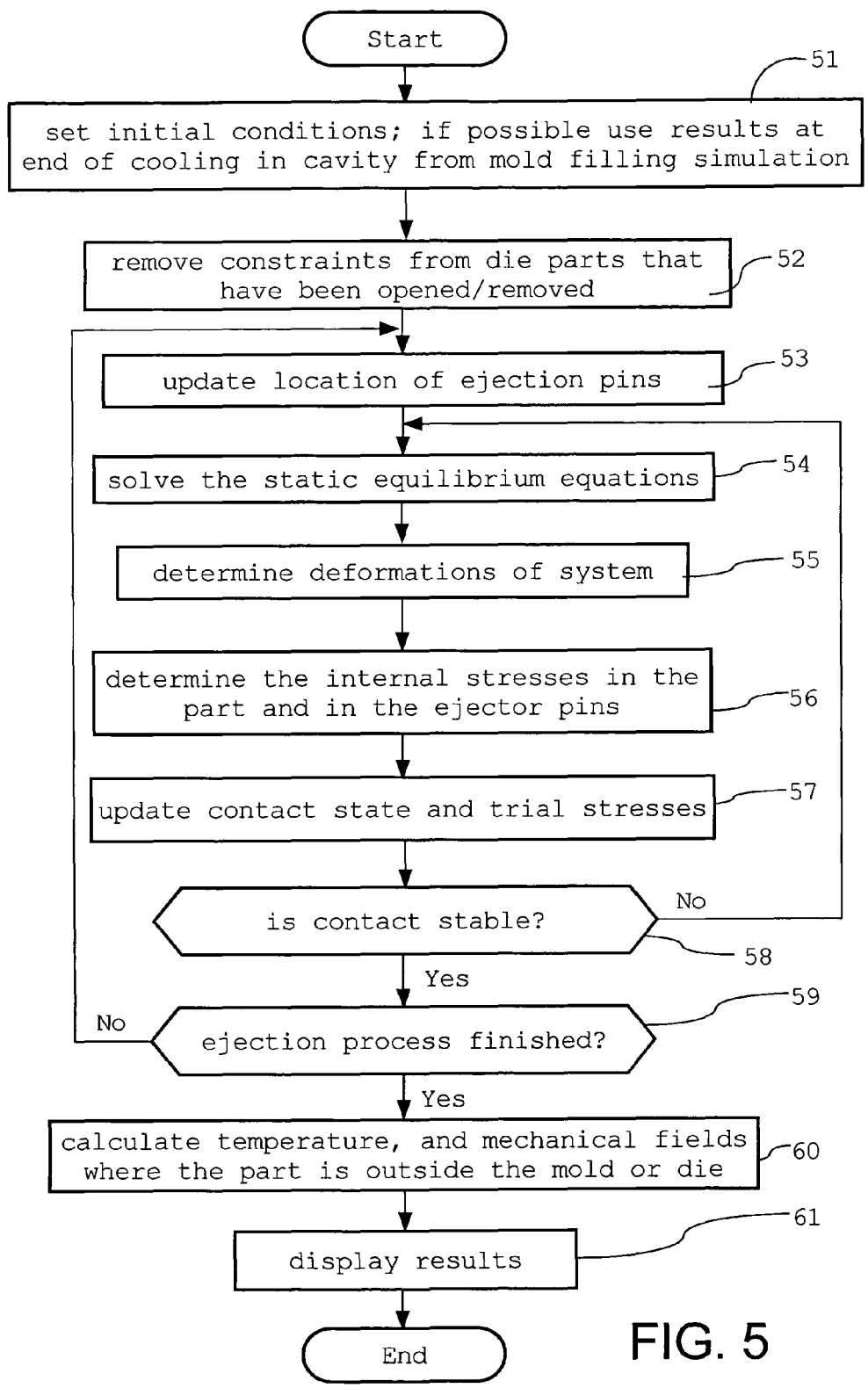
FIG. 5 is a flowchart summarizing the basis steps of simulating a part ejection process according to an exemplary embodiment.

The details of step 50 when simulating the ejection process are illustrated with reference to the exemplary embodiment in the flowchart of FIG. 5. In this part of the process the static equilibrium equations are solved using numerical algorithms:
step 51 the initial conditions for the thermo-physical material properties are set; preferably the results of a mold filling/cooling simulation are used. These results can be stored results of an earlier mold filling and/or cooling/packing/phase transformation/solidification simulation, i.e. the ejection simulation does not have to be performed as an integral part of a mold filling simulation; alternatively, the initial conditions for the ejection simulation based on an assumption of a uniform temperature distribution,
in step 52 the constraints from die/mold parts that have been opened/removed are removed,
in step 53 the location of the ejector pins is updated,
in step 54 the static equilibrium equations are solved for the whole domain or parts of the domain. Optionally, the cooling off and shrinkage may also be determined by solving the thermal equations for the whole domain or part of the domain,
in step 55, the deformations of the system are determined,
in step 56 the internal stresses in the part and in the ejector pins are determined;
in step 57 the contact state and trial stresses are updated;
in step 58 it is determined if the contact state is stable, if the contact state is not stable the process returns to step 54, if the contact state is stable the process proceeds to step 59;
in step 59 it is verified if the ejection process has finished; if the ejection process is not finished the simulation continues with the next time step and the process returns to step 53 to update the position of the pins;

if the ejection process has completed the simulation proceeds to step 60, to compute temperature, and mechanical fields where the part is outside the mold or die e.g. temperature, shrinkage, warpage, etc. using the information obtained from the injection molding, cooling, packing, phase transformation/solidification simulation and the ejection simulation, and then the process moves to step 61 to display the simulation results as a graphical or numerical presentation on the display of a computer such as a PC or a workstation (if the ejection simulation is an integral part of a mold filling, cooling/packing phase transformation/solidification simulation this would be the return to step 34 of FIG. 4).

The shrinkage and warpage calculation in step 58 is a solid mechanical calculation where the governing equations are the static equilibrium equations, i.e. force equilibrium in the calculation domain.

In an embodiment the ejection simulation also includes a solid mechanical calculation on the ejector pins and provides information regarding resulting stresses and distortions for the pins.

In this type of calculation the material is loaded by the thermal strain coming from temperature differences as function of time plus e.g. volumetric changes coming from phase transformations or curing. Stresses are built up inside the material domain either due to uneven contraction/expansion in the domain or due to boundary conditions coming from e.g. the surrounding die or the applied boundary conditions given by the defined ejector pins. If the material is not constrained from contracting/expanding it will deform instead of building up stresses. Typically, when the part is inside the mold/die and cooling, it will shrink around inner mold parts. If it is cooling too long inside the mold/die it will start to stick. Therefore it becomes harder to remove the part and hence the forces that are needed to eject the part will increase due to increasing friction.

On top of the governing equations (the equilibrium equations), the interface problem between the part and the mold/die is solved with a contact algorithm. This algorithm makes sure that the constraints from the mold/die are enforced when the part material shrinks on enclosed areas of the mold. It also makes sure that a gap is formed between the part material and the mold/die where the part material shrinks away from the mold/die.

To model the ejection process, the contact algorithm includes friction at the interfaces where the algorithm has detected contact, i.e. in the interfaces where a contact pressure has been built up. This contact pressure is associated with friction between the part and the mold die/cores, which can be modeled for example by the Coulomb friction law.

The material's response to the loading, i.e. what level of internal stresses build up in the material when it is subjected to the loading/deformation, is described by the constitutive law. For this part of the modeling the software uses a non-linear material model which is typically necessary to describe the full load history and to predict the transient and residual stresses and deformations more accurately.

In an embodiment the following stress results can be selected to be computed:
Displacement
Normal Stress
Shear Stress
Mechanical Normal Strain
Mechanical Shear Strain
Normal Strain Rate
von Mises Stress
Principal Stress
Reference Strain
Total Strain
Shear Strain Rate
Reference Strain Rate
Principal Strain
Principal Strain Rate Note that the Displacement results indicate the warpage or distortion of the cast or molded component.

Mold inserts can also be defined. The deformation of the insert during filling/cooling/packing/phase transformation/solidification can be taken into account.

During the packing and cooling phase, the molded article loses heat towards the mold and starts to shrink. However the mold hinders a free shrinkage of the article. In some areas the molded article will lose its contact to the mold wall; here it is more free to shrink. In other areas the shrinkage tightens the contact-pressure to the mold; the molded article shrinks on mold details, e.g. on cores or pins. This intense contact with the mold restricts the free shrinkage of the molded article significantly; therefore internal stresses are building up.

Additionally a high packing pressure can lead to a similar effect in rib-shaped areas. When ribs are over-packed the thermal shrinkage is not sufficient to allow the molded article to shrink away from the mold wall in the rib area. The results are increased internal stresses.

The ejection simulation software automatically detects the interaction between molded article (part) and cavity wall. The interface is defined as contact surface and used to apply constraints onto the molded article (part).

In a simulation this means:
the molded article is either able to locally shrink away from the mold wall, in this case the constraints are removed from the corresponding interface region,
or the molded article shrinks onto the mold wall, in this case the corresponding interface/contact surface will be constrained in direction normal to the contact surface (perpendicular to the mold wall). Due to the constraints the molded article is not allowed to penetrate the contact surface or to shrink beyond the mold wall.

In an embodiment the following data is attached to the simulation and can be determined by the user of the simulation software.

Tool (Die/Mold):
Stiffness (Construction)
Cooling
Material
Thermal properties
Friction properties/surface roughness
Part (molded article):
Wall thickness
Cross sections
Plane projection
Undercut
Polymer or Metal Alloy:
Friction properties
Mechanical properties
Thermophysical data
Shrinkage characteristics
Process parameters:
Pressure curve
Temperature development
Contact temperature
Ejector pin movement The user interface of the simulation software running on a work station or PC allows a user to vary the process parameters, such as the ejector pin placement, ejector pin diameter and ejector pin (control) movement conditions.

Thus the part ejection simulation method may also include allowing the user to select, alone or in combination, the number of ejector pins, the placement of the ejector pins, the speed of the ejector pins, or the dimensions of the ejector pins. The method can be accomplished through a user interface for an application that simulates the ejection of a part from a mold cavity using ejector pins, where the user interface is configured to allow the user to define (that is, accept user input defining) the number of ejector pins, define placement of the ejector pins, define the geometry of the ejector pins, and define the speed at which the ejector pins move.

In summary, the method for simulating the process of filling a mold and ejecting a part from a mold cavity with the help of ejector pins includes providing a three dimensional computer model defining the geometry of the solution domain, specifying the boundary conditions, discretizing a solution domain based on the model to form a mesh with a plurality of cells, attaching the physical data for the materials, solving the energy and flow equations for at least a portion of the solution domain, computing flow and temperature conditions in the respective cells as a function of time, using the results of the mold filling simulation as the start conditions for the ejection simulation, solving static equilibrium equations for at least a portion of the solution domain, and computing the effects of the ejection process on the part.

This is illustrated with reference to the screenshots of an exemplary embodiment of the simulation software in FIGS. 6 to 11.

Figure 6:
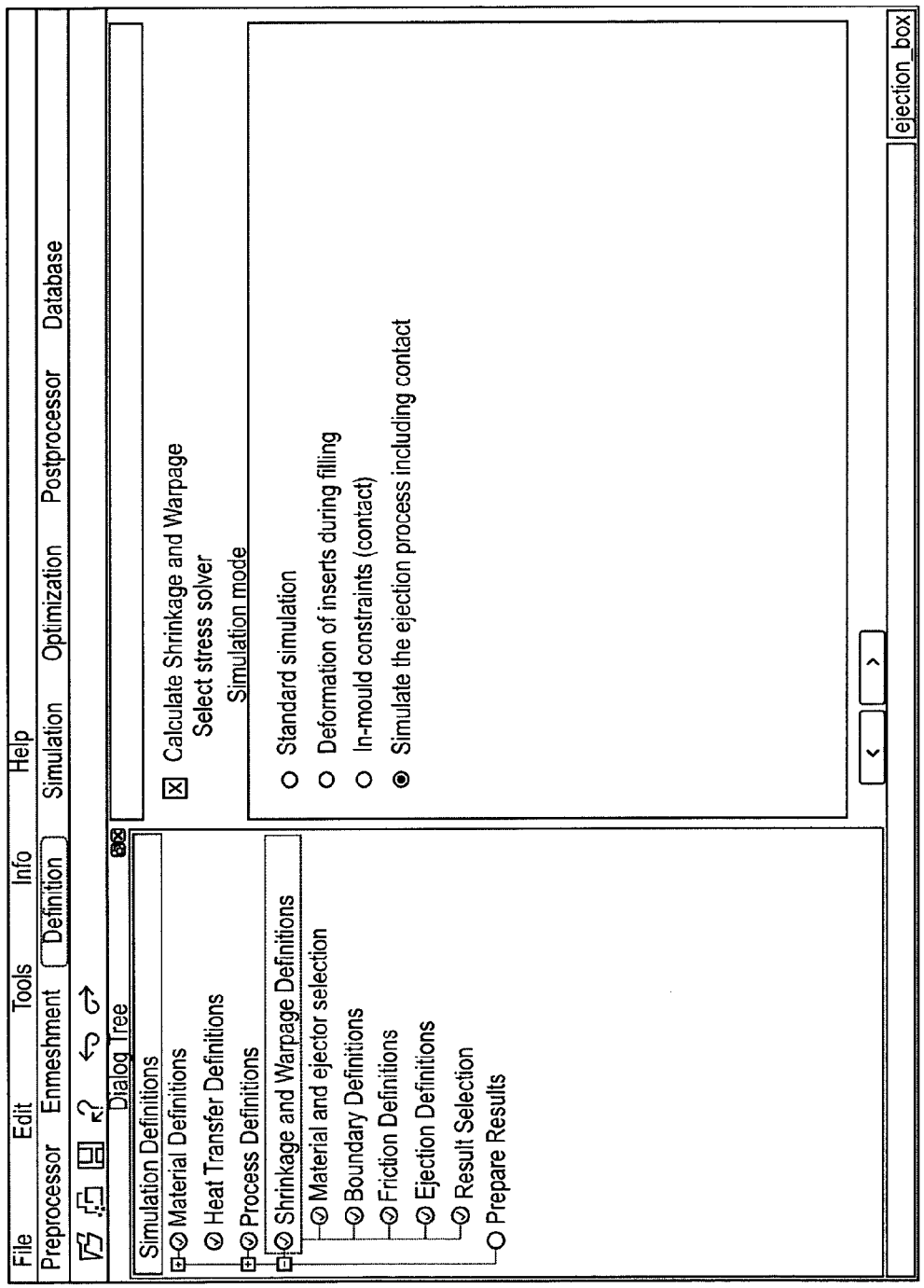
FIG. 6 is a screenshot of a mold filling and part ejection simulation software according to an exemplary embodiment and illustrating the selection that the ejection process is to be included in the simulation.

FIG. 6 shows a screenshot that gives the user a possibility to select the simulation of the ejection to be included in the mold filling and cooling/packing simulation or not.

Figure 7:
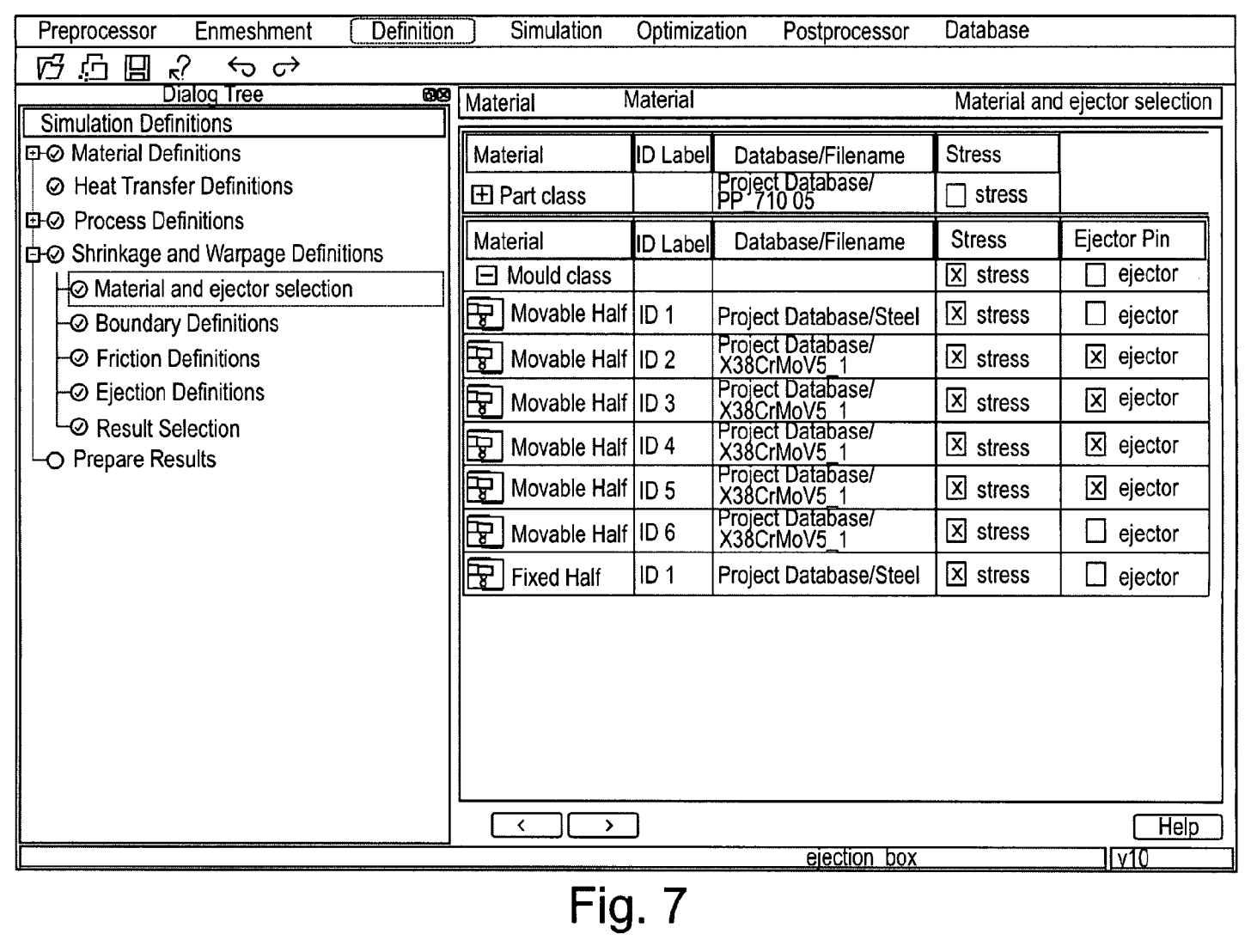

FIG. 7 is a screenshot showing how the user can select the materials and the ejector pins.

Figure 8:
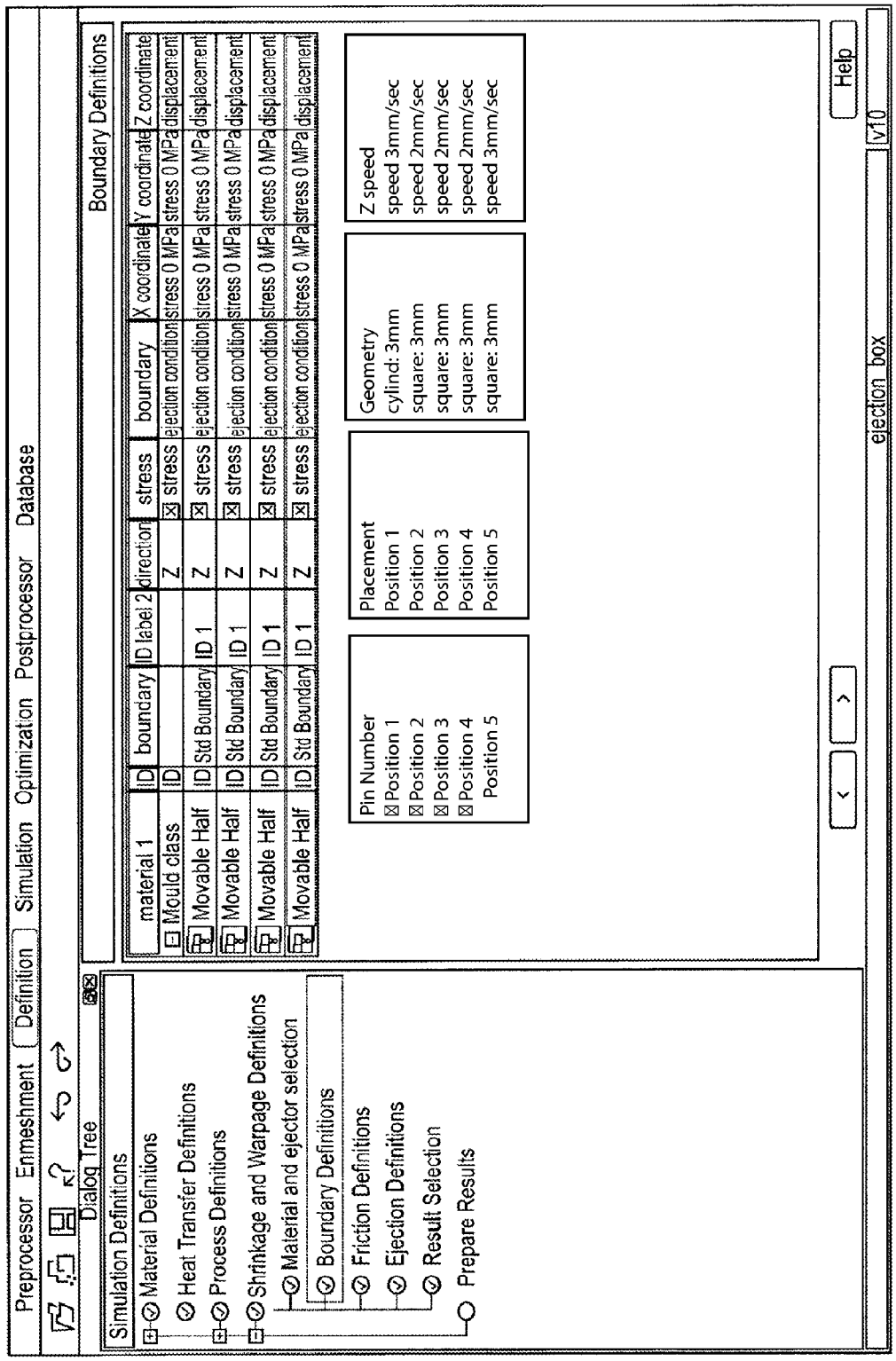
FIG. 8 is a screenshot of the simulation software of FIG. 6, showing the selection of the mechanical boundary conditions and hence the control (movement) of ejector pins.

FIG. 8 is a screenshot showing how the user can edit the mechanical boundary conditions which can also define the movements of the ejector pins, i.e. the input parameters for the pin movement. As shown in FIG. 8, the boundary conditions and input parameters for the pin movement can include the number of pins (by selecting pins by number), the placement of the pins, the geometry of the pins, and the speed at which the ejector pins move.

Figure 9:
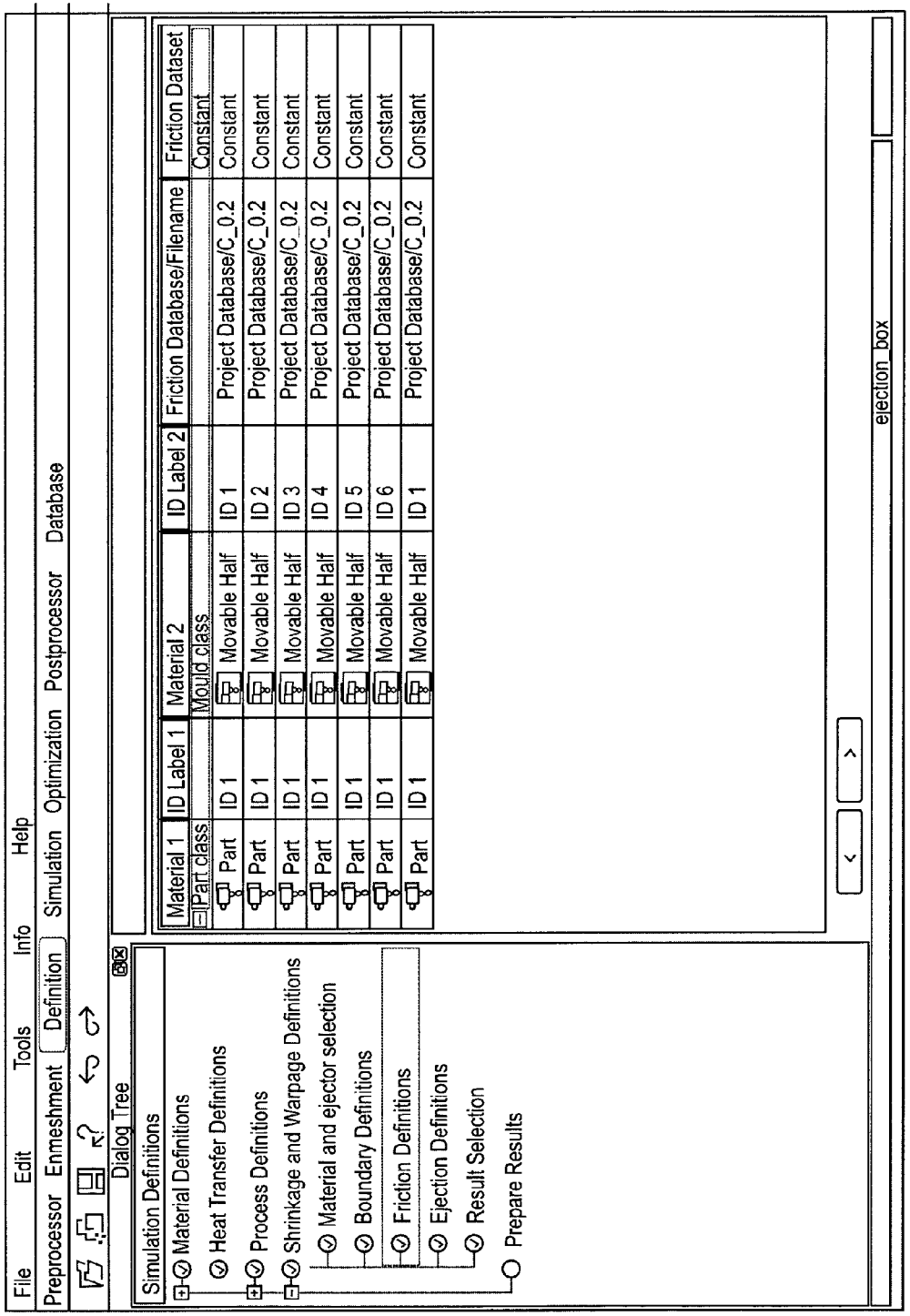
FIG. 9 is a screenshot of the simulation software of FIG. 6, showing the selection of the friction definitions for the ejection simulation.

FIG. 9 is a screenshot showing the selection of the friction definitions.

Figure 10:
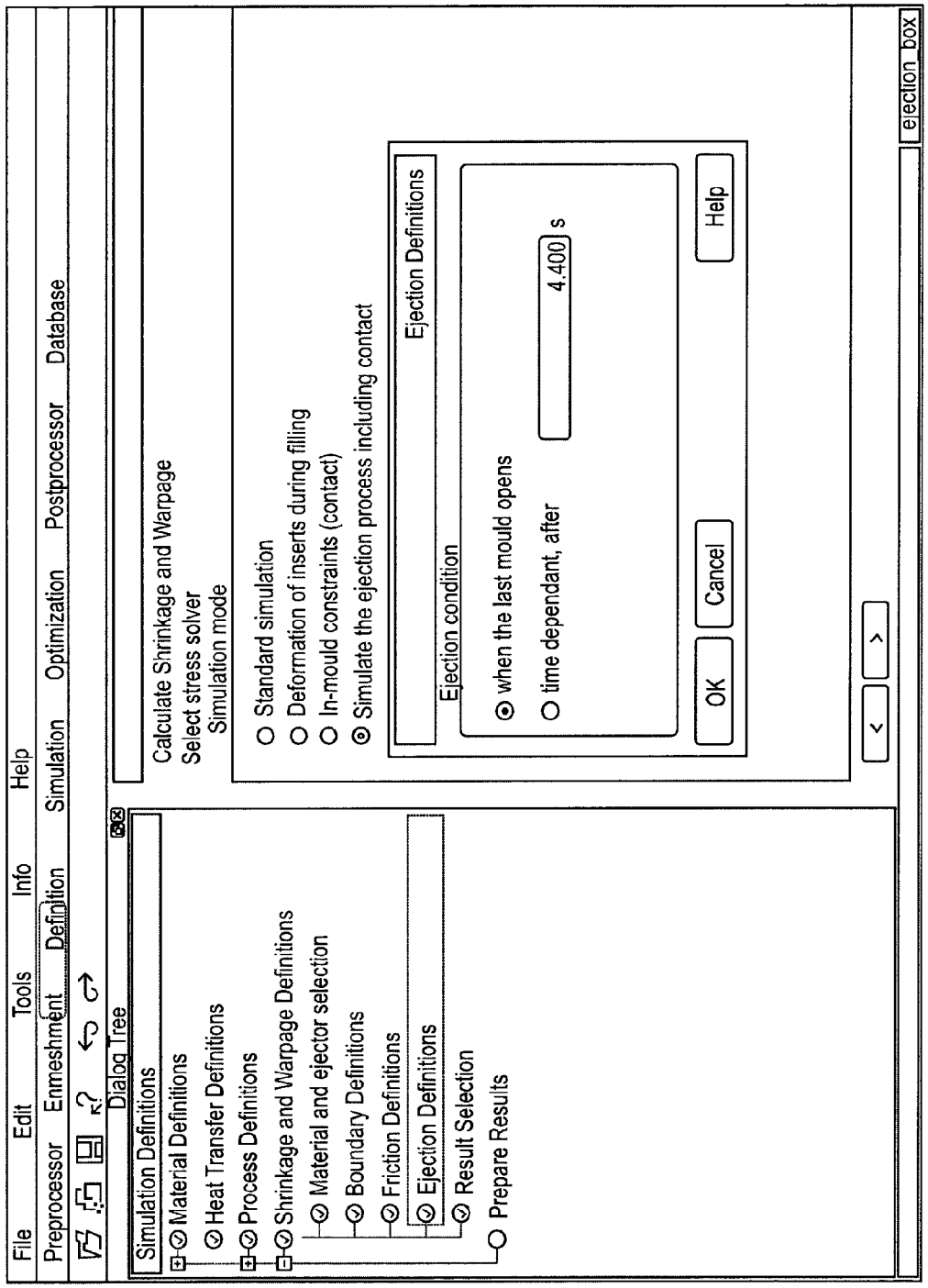
FIG. 10 is a screenshot of the simulation software of FIG. 6, showing the selection of ejection definitions.

FIG. 10 shows a screenshot for defining when/how to start the ejection process. Examples are e.g. automatically ('when last mold opens'=default entry) or the user can define a time ('time dependent after') which relates to the beginning of cooling phase. In this screenshot the start of the ejection process is defined as when the last part of the mold opens.

Figure 11:
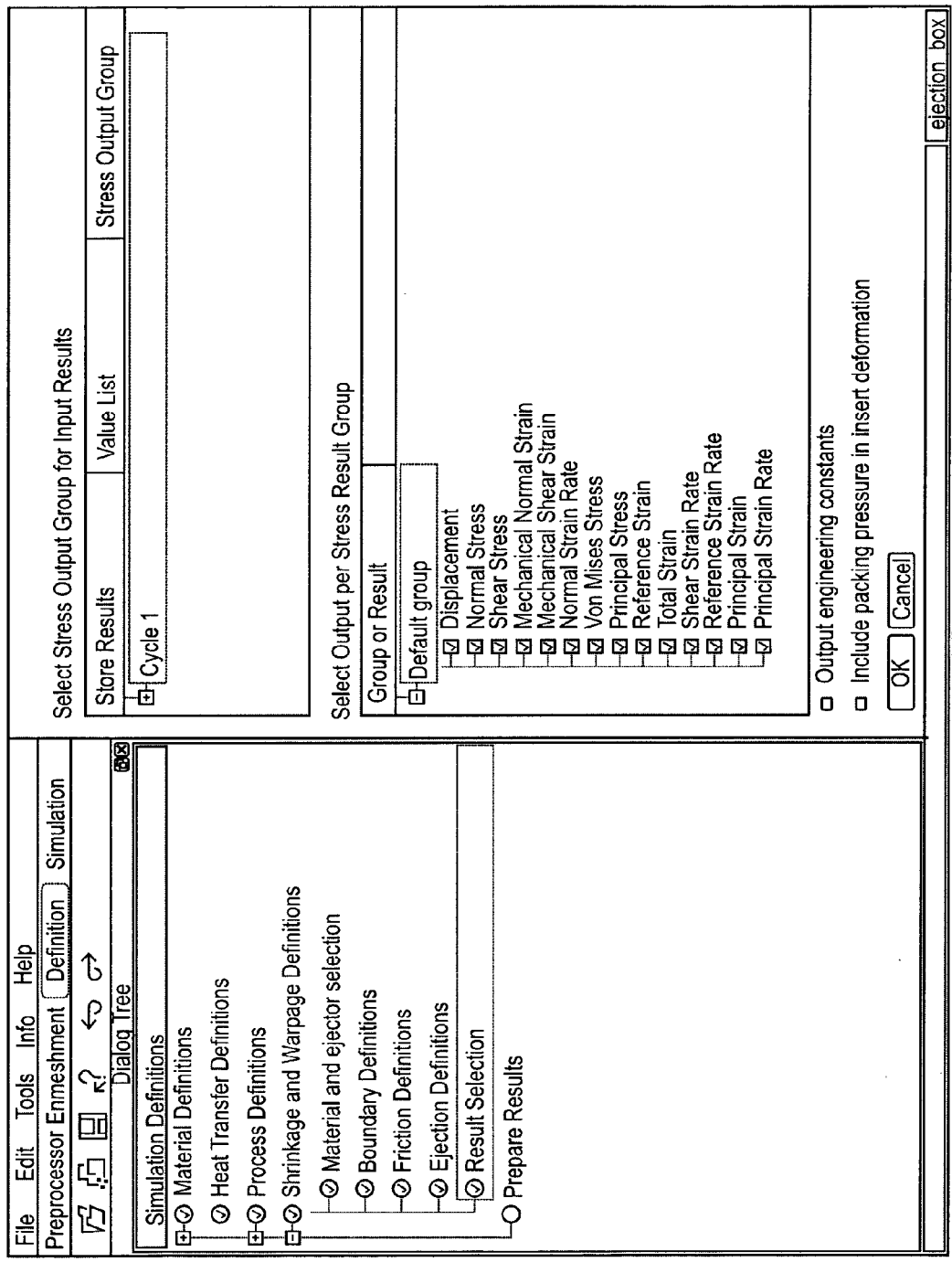
FIG. 11 is a screenshot of the simulation software of FIG. 6, showing the selection of the output results.

FIG. 11 shows a screenshot relating to the selection of the results that are to be recorded/shown at the end of the simulation process.

Figure 12:
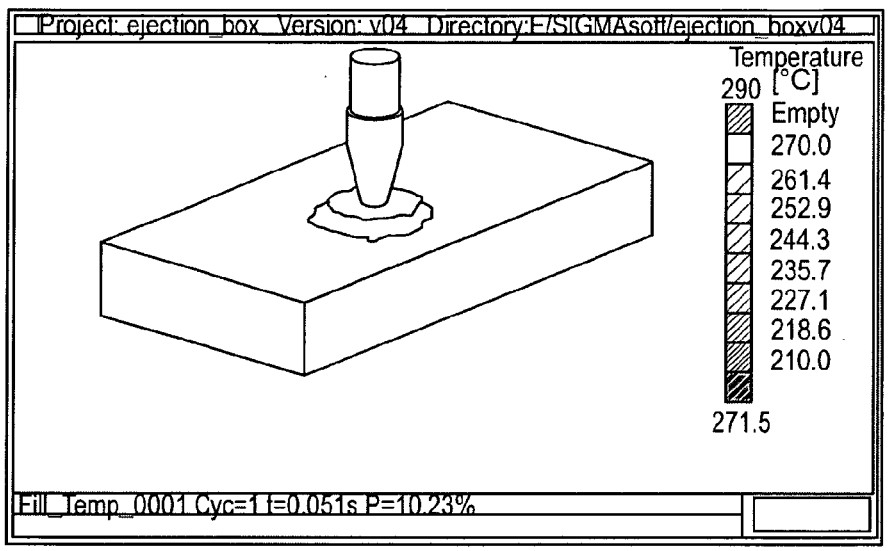
FIGS. 12 to 14 are screenshots showing the results of the mold filling and cooling/packing/solidification process simulation with the simulation software of FIG. 5, FIGS. 15 to 17 show schematically the ejection of the part resulting from the mold filling and cooling/packing/solidification simulation of FIGS. 12 to 14, FIGS. 18 through 21 illustrate the results of the ejection process simulation in the form of the stresses and displacement of the part for which the mold filling was simulated in FIGS. 12 to 14.
Figure 13:
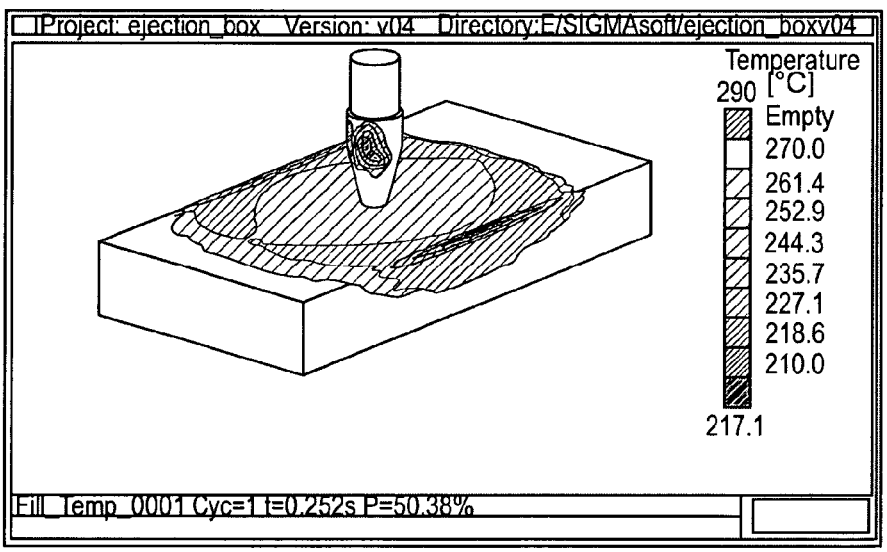
Figure 14:
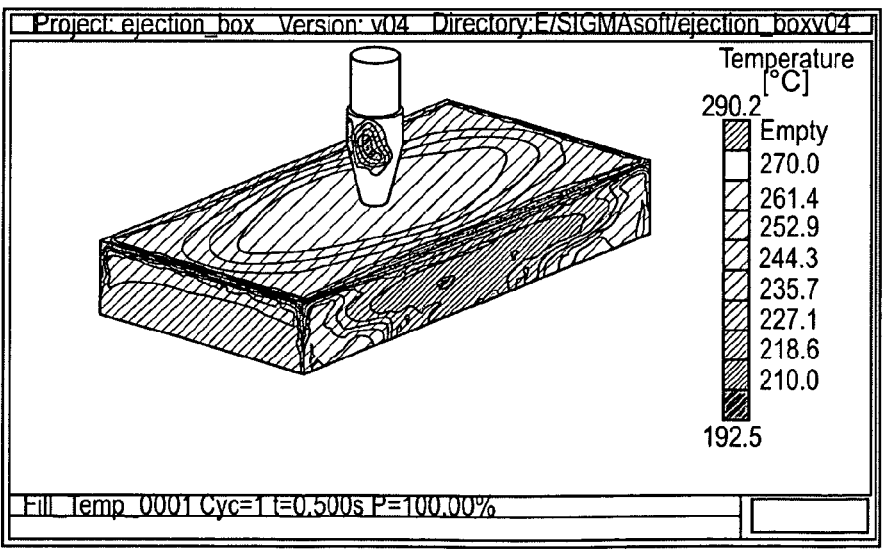

FIGS. 12 to 14 are screenshots showing the results of the mold filling and cooling/packing/phase transformation/solidification simulation. FIG. 12 shows the mold filling in the beginning of the mold filling process. As can be seen the flow is still very near to the ingate. In FIG. 13 the flow from the ingate has moved approximately halfway and in FIG. 14 the cavity is completely filled. At the end of the filling phase, there are local areas where the material changed its phase status due to heat transfer between part (molded article) and the mold. A cooling phase follows where heat is transferred from the part to the mold. The material changes its phase status according to local cooling conditions. The material is packed due to external pressure on the material. The viscous mass changes to a solid material. During this process, the typical mechanical properties are built up. During cooling and phase transformation, the material typically shrinks. In areas where shrinkage is hindered by mold walls, the material shrinks onto the mold.

In the screenshots the temperature of the various sections of the material are illustrated in color with reference to the scale on the right side of the screenshots. In the present black-and-white/grayscale version this may be difficult to recognize due to the limitations in patents or patent applications with respect to the representation of color.

Figure 15:
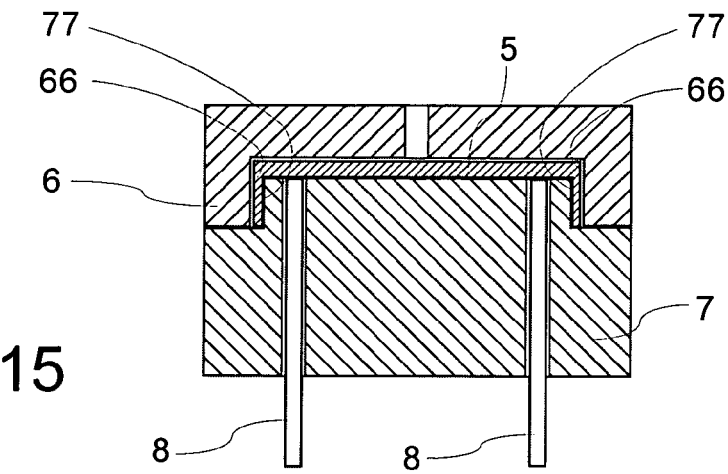
Figure 16:
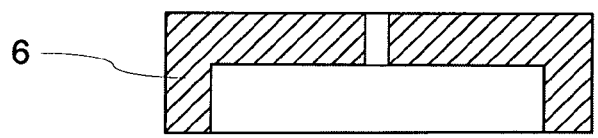
Figure 16:
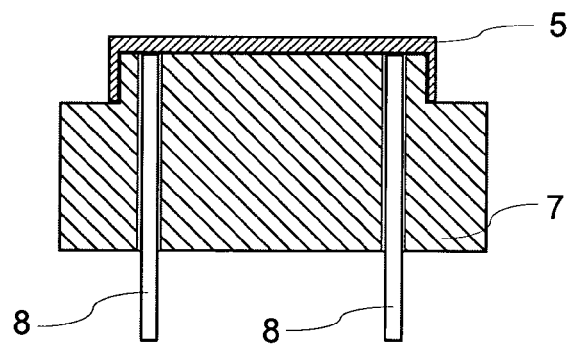
Figure 17:
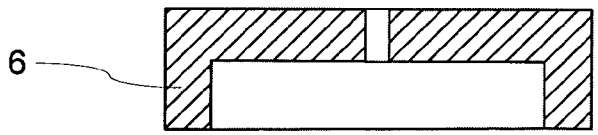
Figure 17:
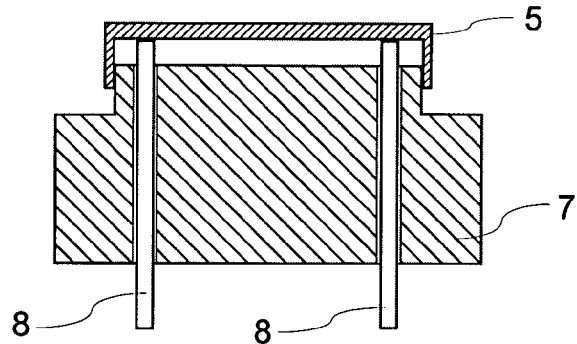
Figure 18:
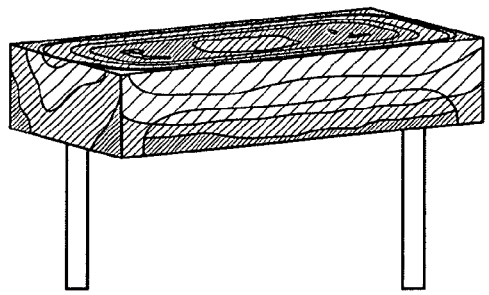
Figure 19:
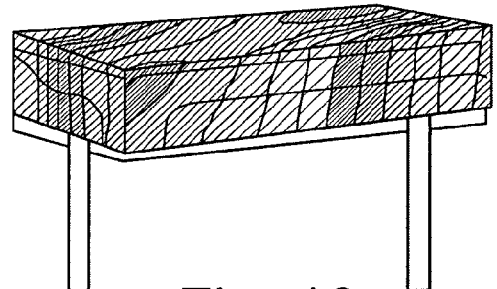
Figure 20:
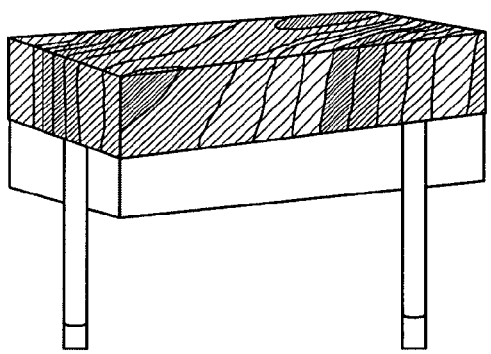
Figure 21:
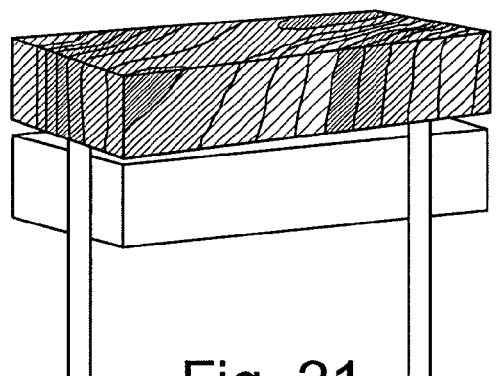

In this example the results of the mold filling and cooling/packing/phase transformation/solidification simulation are used for the ejection simulation. FIGS. 15 to 17 show schematically the ejection process of the part 5 for which the mold filling simulation resulted in the screenshots of FIGS. 12 to 14. The part 5 is ejected from the movable mold half 7 by the ejector pins 8. In this example there are only two ejector pins 8 for illustrative purposes. However, in reality molds, such as in injection molding, may have a large number of ejector pins. In FIG. 15 the areas with reference numeral 77 indicate areas where the part 5 has shrunk onto mold half 7 and the areas with reference numeral 66 indicate areas where there is a gap between the part 5 and the mold half 6. In FIG. 16 mold half 6 is retracted and in FIG. 17 the ejection process is ongoing.

FIGS. 18 through 21 show the results of the ejection process simulation in the form of screenshots that illustrate the displacement of the part and the ejector pins. The local stresses, strains or local displacement of the part in various directions can be visualized by color variations. In these figures, the stresses in the top-to-bottom direction of the figure are displayed in color, which can be recognized as grayscale variations in the figures. In addition, the relative displacement of the components is visualized through an exaggerated distortion. Especially in FIG. 21, the corners of the component in contact with the ejector pins can be seen to be pushed farther upwards than the other two corners.

Figure 22:
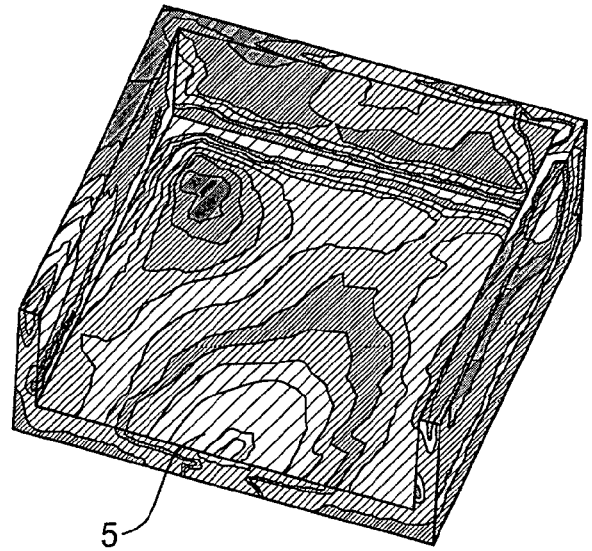
FIGS. 22 and 23 illustrates the results of the ejection process simulation in the form of the stresses and warpage on the part for which the mold filling and cooling, together with phase transformation was simulated in FIGS. 12 to 14, when a single ejector pin is used.
Figure 22:
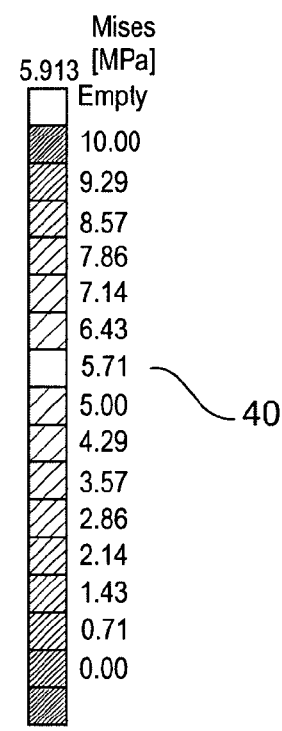
Figure 23:
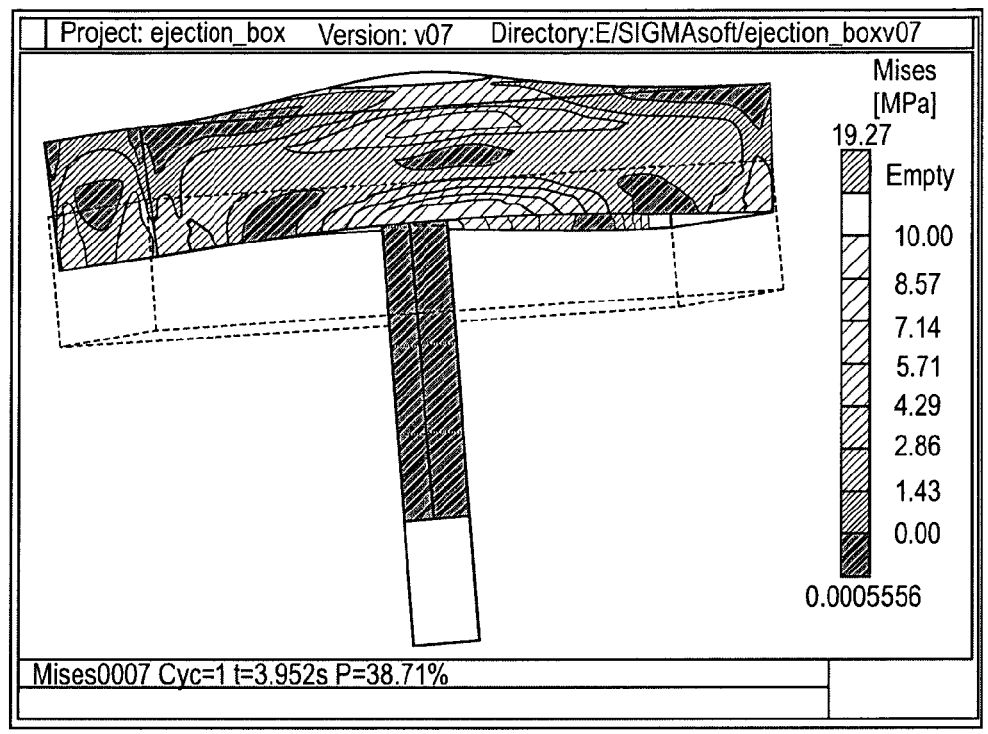

FIGS. 22 through 23 show the results of the ejection process simulation in the form of screenshots that illustrate the stresses in the part when a single centrally located ejector pin is used. The stress level on the part is illustrated by color variations in the screenshot, which can be recognized as grayscale variations in the figures and are related to the scale 40 on the right side of the part. In FIG. 22, the effects of the centrally located ejector pin on the Mises stresses in the component can be seen. In FIG. 23, once again the stresses in the part are visualized. In addition, the local displacement of the component due to the ejector pin is visualized through an exaggerated distortion. For this situation, the ejector pin leads to a significant deformation of the center of the box-like component.

Figure 24:
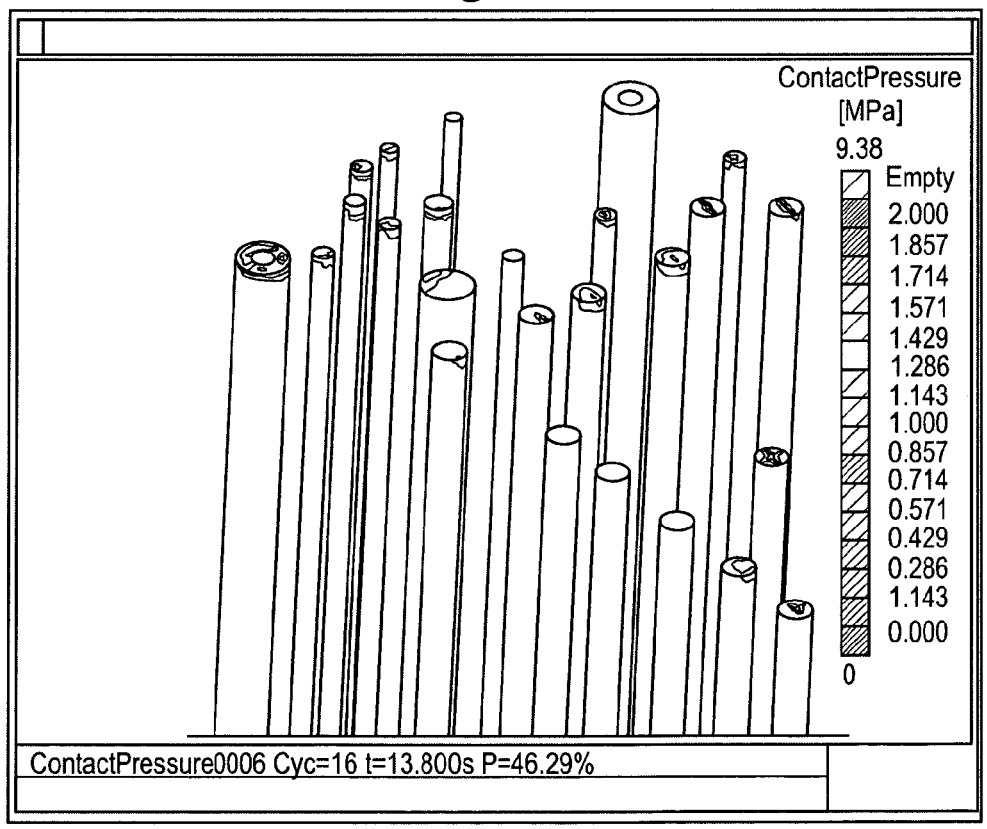
FIG. 24 illustrates the simulation result of the contact pressure on the ejector pins in a more realistic scenario with a larger number of pins.

FIG. 24 shows the results of an ejection process simulation in the form of a screenshot that illustrates the contact pressures on a set of ejector pins during a point in time during the ejection process. Using this information, the required ejection forces can be estimated and the local forces acting on the part during ejection can be determined.

The various aspects of the teaching of the present document described above can be used alone or in various combinations. The teaching of the present document is preferably implemented by a combination of hardware and software, but can also be implemented in hardware or software.

The teaching of this document has numerous advantages. Different embodiments or implementations may yield one or more of the following advantages. It should be noted that this is not an exhaustive list and there may be other advantages which are not described herein. One advantage of the teaching of this document is that it provides a tool for improving the simulation results for molded articles. It is another advantage of the teaching of this document that it provides for a method that allows the effect of the ejection of a part after mold filling and cooling inside the die/mold to be taken into account in a simulation. It is yet another advantage of the teaching of this document that it provides for an apparatus that allows the effect of the ejection of a part after mold filling, cooling, packing, phase transformation/solidification to be taken into account in a simulation. It is a further advantage of the invention that it provides for user interface and allows input of the parameters required for simulation often ejection process of a part from a mold cavity.

Although the teaching in this document has been described in detail for purpose of illustration, it is understood that such detail is solely for that purpose, and variations can be made therein by those skilled in the art without departing from the scope of the teaching.

For example, although the teaching has been described in terms of an injection molding process and a die casting process it should be appreciated that the teaching may also be applied to other types of mold filling processes such as e.g. blow molding.

Features described in the preceding description may be used in combinations other than the combinations explicitly described.

Whilst endeavoring in the foregoing specification to draw attention to those features of the teaching of the present document believed to be of particular importance it should be understood that the Applicant claims protection in respect of any patentable feature or combination of features hereinbefore referred to and/or shown in the drawings whether or not particular emphasis has been placed thereon.

The term "comprising" as used in the claims does not exclude other elements or steps. The term "a" or "an" as used in the claims does not exclude a plurality. The single processor or other unit may fulfill the functions of several means recited in the claims.

The invention claimed is:

1. A non-transitory computer readable medium including computer program code operable to generate a user interface for an application that simulates ejection of a part from a mold cavity using ejector pins,
   said user interface being configured to accept user input defining a number of ejector pins,
   said user interface being configured to accept user input defining placement of the ejector pins,
   said user interface being configured to accept user input defining geometry of the ejector pins, and
   said user interface being configured to accept user input defining a speed at which the ejector pins move.

2. A method for simulating a process of filling a mold and ejecting a part from a mold cavity with help of ejector pins, said method comprising:
   simulating a process of filling a mold by:
      providing a three dimensional computer model defining a geometry of a solution domain,
      specifying boundary conditions,
      discretizing the solution domain based on the model to form a mesh with a plurality of cells,
      attaching physical data for materials,
      solving energy and flow equations for at least a portion of the solution domain,
      computing flow and temperature conditions in the cells as a function of time, to obtain results of the mold filling simulation; and
   providing an ejection simulation simulating the process of ejecting the part from the mold cavity by:
      accepting, through a user interface, user input defining a number of ejector pins, placement of the ejector pins, geometry of the ejector pins and a speed at which the ejector pins move;
      using results of the mold filling simulation as start conditions for the ejection simulation,
      solving static equilibrium equations for at least a portion of the solution domain, and
      computing effects of the ejection process on the part based on the number of injector pins, the placement of the ejector pins, the geometry of the ejector pins and the speed at which the ejector pins move.

3. The method of claim 2, wherein the computed effects on the part include, alone or in combination, displacement of the part, stress on the part, or warpage of the part.

4. The method of claim 2, wherein the results of the steps of simulating a process of filling a mold further comprise, alone or in combination, results of a cooling, packing, phase transformation, or solidification simulation.

5. The method of claim 2, wherein the ejection simulation produces results comprising, alone or in combination, local strains on the part, or local stress peaks on the part, or contact pressure, or the cooling of the part, or mechanical loads on ejector pins.

6. The method of claim 2, further including providing a visualization of results of the ejection simulation.

7. The method of claim 2, further comprising the step of computing a load on the ejector pins.

8. The method of claim 2, wherein the ejection simulation produces results comprising stresses and distortions for the pins.

9. The method of claim 2, wherein start conditions for the ejection simulation are based on an assumption of a uniform temperature distribution.

* * * * *